UNITED STATES PATENT OFFICE.

ROBERT E. WATSON, OF ALVA, FLORIDA.

INSECTICIDE.

1,156,954.  Specification of Letters Patent.  Patented Oct. 19, 1915.

No Drawing.  Application filed July 3, 1913. Serial No. 777,222.

*To all whom it may concern:*

Be it known that I, ROBERT E. WATSON, a citizen of the United States, residing at Alva, in the county of Lee and State of Florida, have invented certain new and useful Improvements in Insecticides, of which the following is a specification.

This invention has for its object to provide an insecticide in the form of a powder which is highly efficient in destroying insects infesting fruit trees, and more particularly orange, grapefruit and other citrus trees.

The insecticide is composed of the following ingredients combined in the proportions stated:

| | |
|---|---|
| Lime | 45 per cent. |
| Flowers of sulfur | 30 per cent. |
| Tobacco dust | 20 per cent. |
| Paris green | 2½ per cent. |
| Arsenate of lead | 2½ per cent. |
| Total | 100 per cent. |

The lime should be air slaked and hydrated, and the tobacco dust may be ordinary snuff. The Paris green and arsenate of lead should be powdered.

The several ingredients named are thoroughly mixed to produce a fine powder which is sprayed or dusted on the trees to be treated.

Lime and sulfur are well known insecticides and their use in the present compound gives body to the same, and with the tobacco, arsenate of lead and Paris green, form a compound which is highly effective for the destruction of insects infesting citrus trees.

The compound is applied to the trees by using an ordinary dry powder spraying apparatus, and it is applied very early in the morning while the trees are heavily laden with dew. The powder is spread over the trees and settles on the leaves, branches and fruit wet with dew, and when it comes in contact with the moisture, it forms a solution which remains until it is washed off by a heavy rain. The solution completely covers the fruit and leaves and quickly exterminates the insects, and as the wings of the insects are still damp from the dew, they are unable to fly sufficiently to make their escape as is the case when a liquid spray is used.

The compound can be easily and quickly applied and it makes a highly efficient insecticide and a preventive of other insects breeding on the trees.

I claim:

An insecticide in powdered form capable of having certain of its ingredients combine in the presence of water and including aceto-arsenate of copper, arsenate of lead, and slaked lime, said ingredients when in solution combining to form, in addition to the primary ingredients, acetate of lime, arsenate of copper and a double arsenate of copper and lead.

In testimony whereof I affix my signature in presence of two witnesses.

ROBERT E. WATSON.

Witnesses:
EDDIE LAMB,
H. H. TUSSEY.